United States Patent [19]

Sefton et al.

[11] 4,123,260
[45] Oct. 31, 1978

[54] SELECTIVE RECOVERY OF NICKEL AND COBALT OR COPPER AND ZINC FROM SOLUTION

[75] Inventors: Verner B. Sefton, Edmonton; Russell P. Kofluk, Opal, both of Canada

[73] Assignee: Sherritt Gordon Mines Limited, Toronto, Canada

[21] Appl. No.: 796,495

[22] Filed: May 12, 1977

[30] Foreign Application Priority Data

Feb. 25, 1977 [CA] Canada .................................. 272687

[51] Int. Cl.² .................... C22B 15/08; C22B 19/22
[52] U.S. Cl. ............................ 75/117; 75/101 BE; 75/119
[58] Field of Search ............... 75/119, 101 BE, 117

[56] References Cited

U.S. PATENT DOCUMENTS

| | | | |
|---|---|---|---|
| 2,954,276 | 9/1960 | Hazen | 75/101 BE |
| 3,929,598 | 12/1975 | Stern et al. | 75/101 BE |
| 3,933,975 | 1/1976 | Nikolic et al. | 75/119 |
| 4,042,665 | 8/1977 | Hatch | 75/119 |

*Primary Examiner*—M. J. Andrews
*Attorney, Agent, or Firm*—Robert F. Delbridge; Arne I. Fors

[57] ABSTRACT

A process for separately recovering nickel and cobalt from solution includes adjusting the pH of the solution to a value between about 3 and about 6, and then contacting the solution with a chelating ion exchange resin having aminocarboxylic acid functional groups to selectively load nickel onto the resin to produce a nickel loaded resin and a nickel depleted cobalt containing solution. The process is also applicable to the separate recovery of copper and zinc from solution.

26 Claims, 4 Drawing Figures

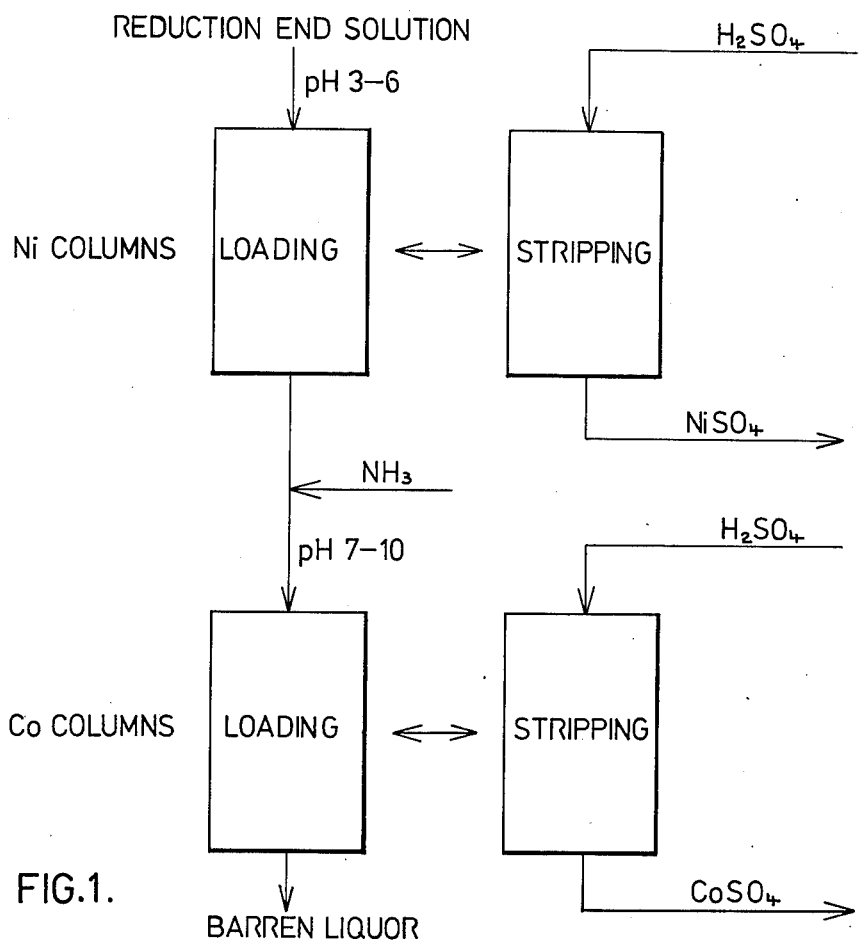
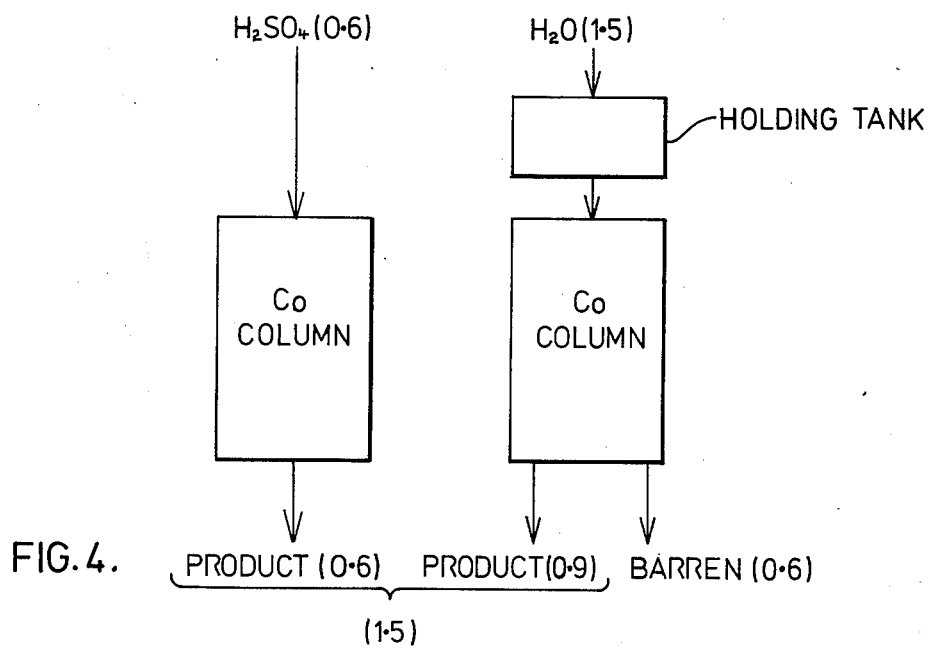
FIG.1.
FIG.4.

SELECTIVE RECOVERY OF NICKEL AND COBALT OR COPPER AND ZINC FROM SOLUTION

This invention relates to the selective recovery of nickel and cobalt from a solution containing dissolved nickel and cobaltous cobalt. The invention is especially useful for selectively recovering nickel and cobaltous cobalt from such solutions which contain a relatively high concentration of an ammonium salt and relatively low concentrations of dissolved nickel and cobalt. The invention also relates to the selective recovery of copper and zinc from a solution containing dissolved cupric copper and zinc.

In certain known hydrometallurgical processes for the recovery of nickel and cobalt from nickel and cobalt containing material, the nickel and cobalt containing material is leached in a leaching medium to produce a leach liquor containing dissolved nickel and cobaltous cobalt. After separation from undissolved residue and various purification steps, the leach liquor is treated to recover the dissolved nickel, for example by causing the precipitation of nickel by use of a reducing gas such as hydrogen, with subsequent separation of the precipitated nickel from the remaining solution. The remaining solution, which is frequently referred to as end solution, may be a relatively strong solution of an ammonium salt, for example ammonium sulphate, and usually contains a relatively small concentration of remaining dissolved nickel as well as a relatively small concentration of dissolved cobaltous cobalt. The concentration of cobalt in the end solution is usually small because the concentration of cobalt in the original nickel and cobalt containing material is usually considerably smaller than the nickel concentration.

Because of the nature of the various steps carried out in known hydrometallurgical processes of the kind referred to above, which are primarily concerned with the recovery of nickel, the dissolved cobalt present in the end solution is usually in the cobaltous form rather than the cobaltic form.

In the past, various methods have been used to recover nickel and cobalt from such an end solution. For example, the nickel and cobalt have been precipitated as mixed sulphides by treating the end solution with hydrogen sulphide gas. More recently, it has been proposed to extract the nickel and cobalt from the end solution by means of an ion exchange resin. However, neither of these methods can separately recover the nickel and cobalt from the end solution.

It is also known that dissolved cobalt in the cobaltic form does not load to any great extent on chelating ion exchange resins which are used to extract nickel from solutions, and thus it is possible to selectively recover nickel and cobalt from end solutions of the kind referred to above by first oxidizing cobaltous cobalt to the cobaltic form, and then using an ion exchange resin which primarily extracts nickel, rather than the cobaltic cobalt, from the end solution. However, the oxidation of cobalt from the cobaltous form to the cobaltic form necessitates the provision of a process step for this purpose, with consequent expense, and usually also necessitates a further process step to convert the cobaltic cobalt back to cobaltous cobalt to enable elemental cobalt to be recovered by standard procedures.

At the present time, with increasing production costs, it would be extremely advantageous if the dissolved nickel and cobaltous cobalt in small concentrations in end solutions of the kind referred to above could be separately recovered from the end solution in a relatively simple manner, thereby avoiding the prior art procedures of removing the nickel and cobalt together from the end solution, or removing the nickel and cobalt separately after the additional step of oxidizing cobalt from the cobaltous form to the cobaltic form.

It has now been discovered that nickel and cobalt can be selectively removed from solutions containing dissolved nickel and cobaltous cobalt by utilizing certain ion exchange resins and controlling the pH of the solution during extraction by the ion exchange resin in a particular manner such that nickel loads more readily onto the ion exchange resin more than cobaltous cobalt.

According to the present invention, nickel and cobalt are selectively recovered from a solution containing dissolved nickel and cobaltous cobalt by adjusting the pH of the solution, if necessary, to a value between about 3 and about 6, and contacting the adjusted solution with a chelating ion exchange resin having aminocarboxylic acid functional groups, for example iminodiacetic acid functional groups, to selectively load nickel onto the resin and produce a nickel loaded resin and a nickel depleted cobalt containing solution. The nickel is subsequently stripped from the nickel loaded resin to produce a nickel containing solution which is substantially free from cobalt. The nickel depleted cobalt containing solution can subsequently be treated for the recovery of cobalt.

The invention is based on the discovery that, if the pH of the solution is between about 3 and about 6, nickel ions are selectively loaded onto ion exchange resins of the kind specified in preference to cobaltous cobalt ions. Preferably the pH is adjusted to between about 4 and about 5 for the selective loading.

According to a further feature of the invention, it has also been unexpectedly found that cobaltous ions are selectively loaded onto ion exchange resins of the kind specified if the pH of the solution is between about 7 and about 10. After selective loading of nickel onto the ion exchange resin at a pH between about 3 and about 6, the pH of the nickel depleted solution can be adjusted to a pH of between about 7 and about 10, preferably between about 7.5 and about 8.5, for example by the addition of ammonia, and the resultant solution contacted with further ion exchange resin of the kind specified so that the cobaltous cobalt ions are selectively loaded thereon. The cobalt loaded on the exchange resin can subsequently be stripped to produce a cobalt containing solution substantially free of nickel. Of course, if desired, the nickel depleted cobalt containing solution can alternatively be treated in a known manner for the removal of cobalt, for example by treatment with hydrogen sulphide gas to precipitate cobaltous sulphide.

For the most expeditious removal of nickel from an end solution in accordance with the invention, a plurality of nickel loading ion exchange columns may be utilized, with the columns being loaded in cascade fashion. Cobalt loading columns, where used, can be operated in a similar fashion.

It has also been found that the same procedure can be used to separately recover copper and zinc from a solution containing dissolved cupric copper and zinc, with the cupric copper being loaded onto the resin in a manner similar to nickel, and the zinc being loaded in a manner similar to cobaltous cobalt.

Embodiments of the present invention will now be described, by way of example, with reference to the accompanying drawings, in which:

FIG. 1 is a simple diagrammatic representation of the selective recovery of nickel and cobalt from a reduction end solution in accordance with one embodiment of the invention;

FIG. 4 is a flow diagram showing a preferred procedure for stripping a loaded cobalt column.

Figure 2:
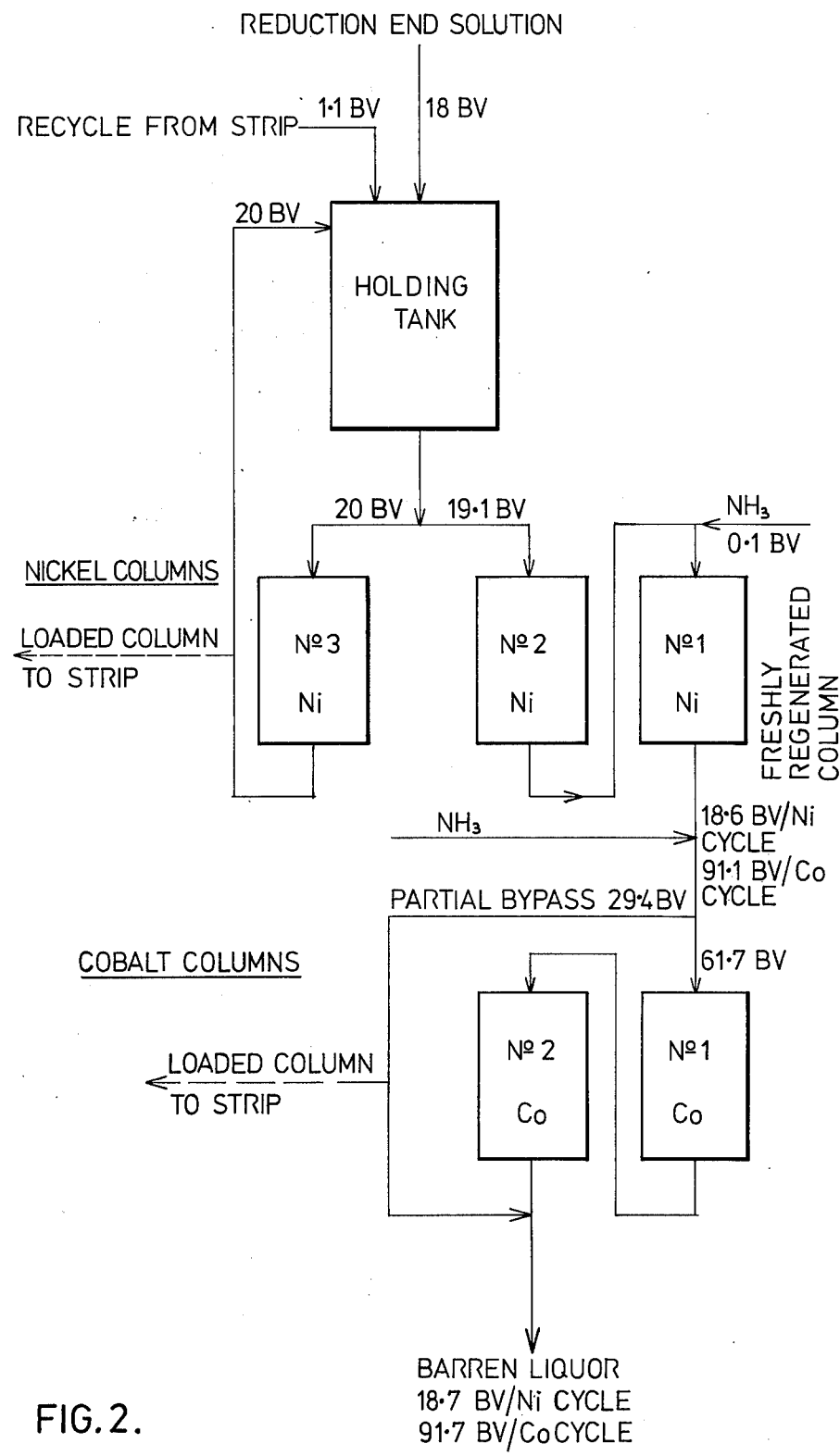
FIG. 2 is a flow diagram illustrating the loading cycle of a preferred embodiment of the invention utilizing three nickel loading columns and two cobalt loading columns.

The starting solution, from which nickel and cobalt are to be selectively extracted, may be reduction end solution from a hydrometallurgical process in which nickel and cobalt containing material has been subjected to an ammoniacal leach and the resultant nickel and cobalt containing leach solution, after separation of undissolved residue and appropriate purification steps, has been subjected to a hydrogen reduction step in which the solution is treated with hydrogen gas at elevated temperature and pressure to cause the precipitation of elemental nickel, which is separated from the resultant solution, known as reduction end solution. This is a known process which is described for example in U.S. Pat. No. 2,734,821 issued Feb. 14, 1956 and need not be described further here, except to mention that typically such a reduction end solution may contain about 0.5 to 3.0 gpl (grams per liter) nickel, 0.2 to 3.0 gpl cobalt (in the cobaltous form) and 200 to 550 gpl ammonium sulphate. In other words, the reduction end solution contains very small concentrations of nickel and cobalt and a high concentration of ammonium sulphate.

For various reasons, the pH of the reduction end solution varies from day to day. In accordance with the invention, the pH of the reduction end solution is adjusted to a value between about 3 and about 6, preferably between about 4 and about 5. If the pH of the reduction end solution is initially too low, i.e., if the solution is too acidic, an alkaline compound such as ammonia can be added to raise the pH. On the other hand, if the pH of the reduction end solution is initially too high, i.e. if the solution is too alkaline, an acidic compound such as sulphuric acid can be added to lower the pH.

After any such necessary pH adjustment, the reduction end solution is passed over an ion exchange resin of the kind specified. As previously indicated, the ion exchange resin used in accordance with the present invention is a chelating ion exchange resin with aminocarboxylic acid functional groups, such as iminodiacetic acid functional groups. The ion exchange resin may be in the ammonium form and is preferably a column of resin beads having a macroporous matrix. The beads may comprise polystyrene with a divinyl benzene crosslinking matrix. Resin beads with a sieve range of from 0.3 to 1.2 mm. and 45 to 50% water content are especially suitable for use in accordance with the invention. Suitable resins which are commercially available are known as Bayer Lewatit T.P. 207, Rohm and Haas Amberlite XE 318, Dow XF 4132 and Akzo Imac 101.

If, as is frequently the case, the reduction end solution contains a high concentration of ammonium sulphate, for example 450 to 550 gpl, an elevated solution temperature should be maintained to prevent crystallization of ammonium salt. In such cases, a temperature in the range of about 60° to 100° C. is desirable.

As indicated in FIG. 1, a single nickel loading column may be used. However, as will be described in more detail later, it may be desirable to use two or more nickel loading columns in particular arrangements which include recycling. After nickel loading, the nickel depleted cobalt-containing solution eluted from the nickel loading column is then treated with an alkaline compound such as ammonia to raise the pH from its previous value to a value between about 7 and about 10, preferably between about 7.5 and about 8.5. The adjusted solution is then passed through a further ion exchange column of the kind referred to above to cause cobaltous cobalt to be loaded thereon. Again, more than one ion exchange column may be used, as will be described in more detail later.

After the nickel loading column has become fully loaded with nickel, it is disconnected from the flow of reduction end solution, and then stripped by an appropriate stripping agent. Between loading and stripping, the loaded column may be contacted with a wash liquid, as also will be described in more detail later. The stripping agent may for example be sulphuric acid, which produces an eluate containing nickel sulphate in solution. A cobalt loaded column can be similarly stripped and, where the stripping agent is sulphuric acid, an eluate containing cobaltous sulphate in solution is produced. It is possible for example to produce an eluate from the nickel column containing about 70 gpl nickel and only about 5 gpl cobalt, and an eluate from the cobalt column containing about 70 gpl cobalt and only about 2 gpl nickel. Such an arrangement can result in the production of barren liquor, that is to say reduction end solution after passing through the nickel loading column and the cobalt loading column, having less than about 0.01 gpl nickel and cobalt.

In the specification, reference will be made to bed volumes. One bed volume is the settled bulk volume of resin in a column. For example, if the bed volume of settled resin in a column is 3 liters, then a 6 liter volume of liquid will be referred to as two bed volumes (BV). It is more convenient to refer to volumes of liquid in this way, that is to say in relation to the volume of the resin bed in a column.

A preferred nickel column and cobalt column arrangement and a loading sequence therefor will now be described with reference to FIG. 2, the reduction end solution being treated having a pH of 4 and containing 1.7 gpl nickel, 0.5 gpl cobaltous cobalt, and 500 gpl ammonium sulphate with the temperature of the solution being maintained at 70°–90° C. Initially, nickel column 1 is a freshly regenerated column, nickel column 2 is a partially loaded column and nickel column 3 is a fully loaded column. Firstly, 0.1 bed volumes of ammonia are passed through freshly regenerated nickel column 1 to ensure that the resin therein is in the ammonium form. 20 bed volumes of reduction end solution are then circulated from a holding tank through nickel column 3 in a down-flow direction and back to the tank to displace any cobalt that may still be loaded on nickel column 3. Nickel column 3 is then put on a stripping cycle, which will be described in more detail later.

19.1 bed volumes of reduction end solution are then passed in a down-flow direction first through nickel column 2 and then through nickel column 1 until nickel column 2 is fully loaded, with nickel column 1 then being partially loaded. At this stage, by use of appropriate control valves and pipe connections, fully loaded nickel column 2 is switched to the number 3 position, partially loaded nickel column 1 is switched to the number 2 position, and a freshly regenerated column from a stripping operation is switched into the number 1 position. The previously described procedure is then repeated.

While the loading steps described above are being carried out, the out-flow or eluate from nickel column 1 is nickel-depleted solution. Approximately the first six bed volumes of eluate from nickel column 1 contain substantially no nickel or cobalt, and are treated as barren liquor. After pH adjustment by ammonia as previously described, the subsequent eluate is passed in sequence through two cobalt columns in a down-flow direction. Cobalt column 1 is initially a freshly regenerated column, and cobalt column 2 is a partially loaded column. 18.6 bed volumes of liquor from nickel column 1 are passed through the two cobalt columns until cobalt column 2 is fully loaded, with cobalt column 1 then being partially loaded. When cobalt column 2 is fully loaded, it is switched to the stripping stage, with cobalt column 1 then being switched to position number 2 and a freshly regenerated column being switched to the number 1 position.

Since, in this case, the cobalt concentration in the reduction end solution is considerably less than nickel concentration, a correspondingly larger number of bed volumes of solution is circulated through the cobalt columns than through the nickel columns to complete a loading sequence. For example, in this case, assuming that each nickel and cobalt column has the same volume of resin, approximately five times the number of bed volumes are required to complete a cobalt loading cycle (including the barren liquor by-passing the cobalt columns) than to complete a nickel loading cycle and, thus, the cobalt loading cycle will only be operated about once for every three to five nickel loading cycles. Specifically, in this case, 18.6 bed volumes of solution were used in each nickel loading cycle, and 91.1 bed volumes of solution were used in each cobalt loading cycle, this latter amount including a total of 29.4 bed volumes by-passing the cobalt columns as barren liquor and 61.7 bed volumes actually passing through the cobalt columns.

It should be pointed out here that each nickel and cobalt loading column contains a certain amount of void or space between the resin beads, the volume of the void in each column concerned in this case being 0.6 bed volumes.

Figure 3:
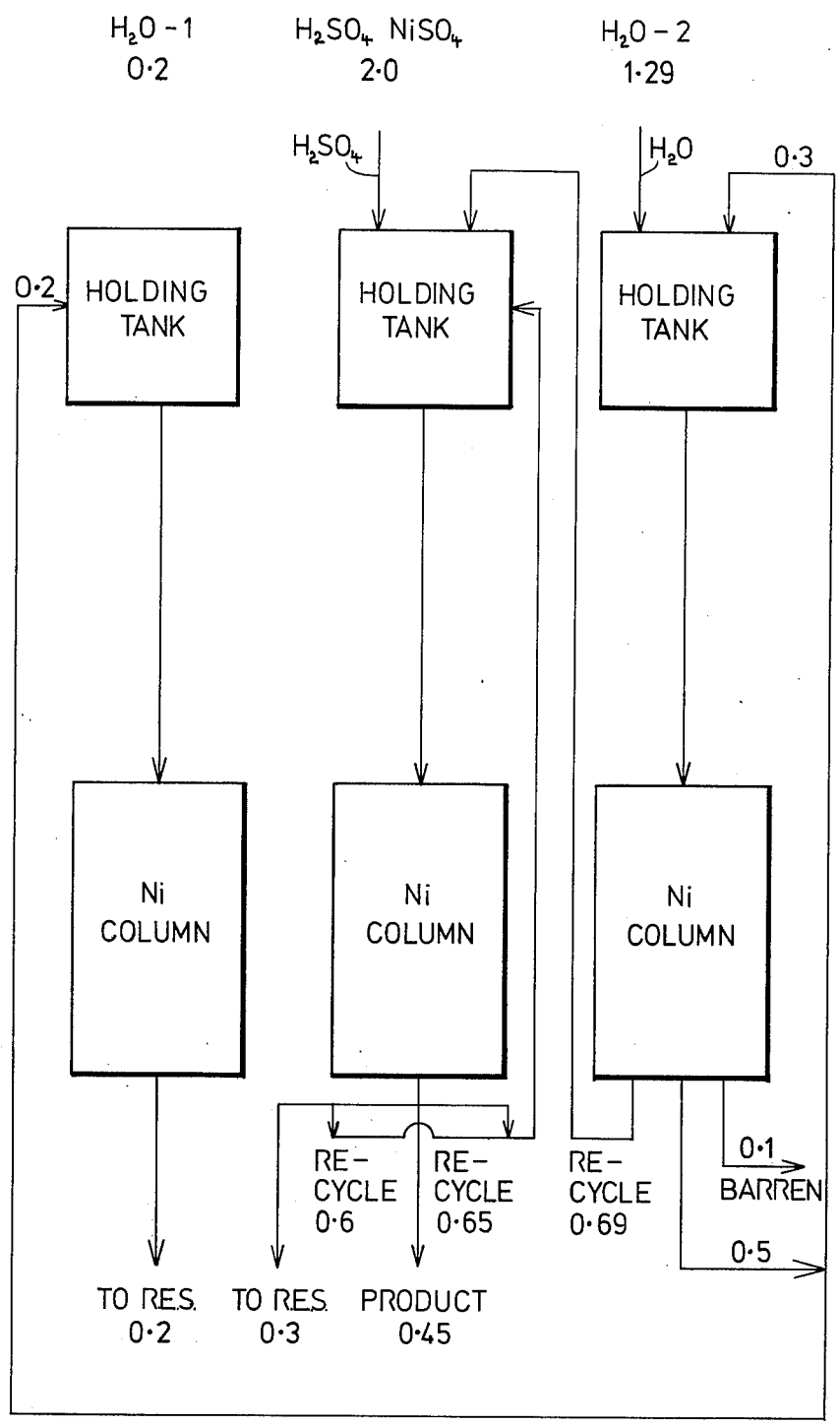
FIG. 3 is a flow diagram showing a preferred procedure for stripping a loaded nickel column.

FIG. 3 shows a preferred three-stage arrangement for stripping a loaded nickel column from position 3 in FIG. 2. In the first stage, 0.2 bed volumes of water are passed through the column, with the out-flow or eluate being returned to the reduction end solution (RES) holding tank shown in FIG. 2.

In the second stage, the column is stripped, by passing 2 bed volumes of dilute sulphuric acid (about 60 gpl) and nickel sulphate solution through the column, the nickel sulphate solution being obtained by recycling, as will be described later. The first 0.3 bed volumes of eluate are returned to the reduction end solution holding tank shown in FIG. 2, and the next 0.6 bed volumes of eluate are recycled to the sulphuric acid holding tank shown in FIG. 3. The next 0.45 bed volumes of eluate are withdrawn as product solution which contains nickel sulphate and the subsequent 0.65 bed volumes of eluate are recycled to the sulphuric acid holding tank.

In the third stage, 1.29 bed volumes of water are then passed through the column. The first 0.69 bed volumes of eluate are recycled to the sulphuric acid holding tank. Of the next 0.5 bed volumes of eluate, 0.2 bed volumes are recycled to the water holding tank of the first stage, and 0.3 bed volumes are recycled to the water holding tank of the third stage. The subsequent 0.1 bed volumes of eluate are withdrawn as barren liquor.

A preferred two-stage arrangement for stripping a loaded cobalt column is shown in FIG. 4. In the first stage, 0.6 bed volumes of sulphuric acid are passed through the column, with the eluate being utilized as product solution, which contains cobaltous sulphate. In the second stage, 1.5 bed volumes of water are passed through the column, with the initial 0.9 bed volumes of the eluate also being regarded as product solution. The subsequent 0.6 bed volumes of eluate are within as barren liquor.

More detailed information with respect to the loading sequence illustrated in FIG. 2 and the stripping sequences illustrated in FIGS. 3 and 4 are shown in Tables 1 and 2.

TABLE 1

| | | BV | Rate (BV/min) | Time (min) | Concentration (gpl soln or resin) | | | | gm/l column loaded | | | |
|---|---|---|---|---|---|---|---|---|---|---|---|---|
| | | | | | Ni | Co | $NH_3$,* | $H_2SO_4$, | Ni | Co | $NH_3$,* | $H_2SO_4$ |
| Loading Nickel columns | | | | | | | | | | | | |
| Fresh RES | | 18 | | | 1.7 | 0.5 | 0 | pH 4.5 | 30.6 | 9.0 | 0 | |
| Feed to cascade (#2) | | 19.1 | 0.065 | 294 | 1.654 | 0.486 | 0 | pH 4.5 | | | | |
| Feed to recycle (#3) | | 20 | 0.10 | 200 | 1.504 | 0.513 | 0 | pH 4.5 | | | | |
| $NH_3$* added | | | | | | | | | | | 30 | |
| $NH_3$ out | | | | | | | | | | | | |
| $NH_3$f in barren | | 18.6 | | | | | 0.20 | | | | 3.8 | |
| $NH_3$ on resin | | 1 | | | | | 7.0 | | | | 7.0** | |
| $NH_3$ as $(NH_4)_2SO_4$ | | 18.6 | | | | | 1.0 | | | | 19.2 | |
| Nickel free liquor | | 18.6 | 0.065 | 286 | 0.011 | 0.387 | 0.25 | | 0.205 | 7.20 | 4.4 | |
| Column Loading | | | | | 31.4 | 1.86 | 7.0 | | 31.4 | 1.86 | 7.0 | |
| to Product | | | | | 30.4 | 1.80 | 2.3 | | 30.4 | 1.80 | 2.3 | |
| to Recycle | | | | | 1.0 | 0.06 | 4.7 | | 1.0 | 0.06 | 4.7 | |
| Stripping Nickel columns | | | | | | | | | | | | |
| Feed | 1) $H_2O^+$ | 0.2 | 0.1 | 2 | | | | | | | | 0.4 |
| | 2) $H_2SO_4/NiSO_4$ | 2.0 | 0.1 | 20 | 42.5 | 2.51 | 5.7 | 51.3 | | 11.4 | | 116.5+ |
| | 3) $H_2O^+$ | 1.29 | 0.05 | 26 | | | | 0.5 | | | | 0.6 |
| Eluate | 4) Displ. Void | 0.6 | 0.1 | 6 | 1.6 | 0.5 | — | 0 | | | | |
| | 5) $H_2O+NH_3$ soln | 0.5 | 0.1 | 5 | 2.0 | 0.12 | 9.8 | 0 | 1.0 | 0.06 | 4.7 | |
| | 6) $H_2SO_4$; Recycle to 2 | 0.6 | 0.1 | 6 | ~45 | ~2.6 | ~10 | 0 | | | 6 | |
| | 7) Product | 0.45 | 0.1 | 4.5 | 67.6 | 4.0 | 5.1 | 0 | 30.4 | 1.80 | 2.3 | |
| | 8) $H_2SO_4$; Recycle to 2 | 0.65 | 0.1 | 6.5 | ~61.4 | ~3.6 | ~5 | 10 | | | 3.25 | 6.5 |
| | 9) $H_2O$; Recycle to 2 | 0.69 | 0.05 | 13.8 | ~9.4 | ~0.6 | 3 | 30 | | | 2.1 | 20.7 |

TABLE 1-continued

|  | BV | Rate (BV/min) | Time (min) | Concentration (gpl soln or resin) | | | | gm/l column loaded | | | |
|---|---|---|---|---|---|---|---|---|---|---|---|
|  |  |  |  | Ni | Co | $NH_{3'}$* | $H_2SO_{4'}$ | Ni | Co | $NH_{3'}$* | $H_2SO_4$ |
| 10) $H_2O$; Recycle to 2 | 0.3 | 0.05 | 6 | 0 | 0 | 0 | 2 |  |  |  | 0.6 |
| 11) $H_2O$; Recycle to 1 | 0.2 | 0.05 | 4 | 0 | 0 | 0 | 2 |  |  |  | 0.4 |
| 12) $H_2O$; to barren | 0.1 | 0.05 | 2 | 0 | 0 | 0 | 2 |  |  |  | 0.2 |

*$NH_3$ added as aqua and stripped from resin; excludes $NH_3$ from $(NH_4)_2SO_4$ in feed RES.
**4.7 of 7.0 is recycled to RES during stripping.
+Total new $H_2O$ required = 0.2 + 1.29 − 0.2 − 0.3 = 0.99 BV
Total new $H_2SO_4$ required = 75.5 gm/l lt resin.
1 BV = 1t volume.

TABLE 2

|  | BV | Rate (BV/min) | Time (min) | Concentration (gpl soln or resin) | | | | gm/l column loaded | | | |
|---|---|---|---|---|---|---|---|---|---|---|---|
|  |  |  |  | Ni | Co | $NH_{3'}$* | $H_2SO_{4'}$ | Ni | Co | $NH_{3'}$* | $H_2SO_4$ |
| Loading Cobalt columns |  |  |  |  |  |  |  |  |  |  |  |
| Ni free liquor (new) | 61.7 |  |  | 0.016 | 0.567 | 1.2 | 0 | 0.98 | 35.0 | 74.0 |  |
| Total feed | 62.8 | 0.08 | 785 | 0.015 | 0.565 | 1.18 |  | 0.94 | 35.5 | 74.0 |  |
| to position 1 | 58.8 |  | 735 |  |  |  |  |  |  |  |  |
| to position 2 | 62.8 |  | 785 |  |  |  |  |  |  |  |  |
| $NH_3$ added |  |  |  |  |  |  |  |  |  |  |  |
| $NH_3$ out |  |  |  |  |  | 1.2 |  |  |  | 74.0 |  |
| $NH_{3'}$ in barren | 62.3 |  |  |  |  | 0.53 |  |  |  | 33.0 |  |
| $NH_3$ in resin | 1.0 |  |  |  |  | 20.0 |  |  |  | 20.0 |  |
| $NH_3$ ub $(NH_4)_2SO_4$ | 62.3 |  |  |  |  | 0.34 |  |  |  | 21.0 |  |
| Barren liquor |  |  |  |  |  |  |  |  |  |  |  |
| ex Co | 62.3 |  |  | 0.001 | 0.01 | 0.53 |  | 0.062 | 0.62 | 33 |  |
| bypassed | 29.4 |  |  | 0.001 | 0.01 | 0.2 |  | 0.029 | 0.29 | 6.0 |  |
| Total | 91.7 |  |  |  |  |  |  |  |  |  |  |
| Column loading | 1 |  |  | 0.94 | 35.5 | 20.0 |  | 0.94 | 35.5 | 20.0 |  |
| to Product |  |  |  | 0.91 | 34.4 |  |  | 0.91 | 34.4 |  |  |
| to Recycle |  |  |  | 0.03 | 1.1 |  |  | 0.03 | 1.1 |  |  |
| Stripping Cobalt columns |  |  |  |  |  |  |  |  |  |  |  |
| Feed  1) Acid | 0.6 | 0.1 | 6 | 0 | 0 | 0 | 250 |  |  |  | 150+ |
| 2) $H_2O$ | 1.5+ | 0.05 | 30 | 0 | 0 | 0 |  |  |  |  |  |
| Eluate  3) Displ. Void | 0.6 |  |  | 0.016 | 0.57 | 1.2 | 0 |  |  |  |  |
| 4) Product $H_2SO_4$ | 0.6 | 0.1 | 6 |  |  |  |  |  |  |  |  |
| 5) Product $H_2O$ | 0.9 | 0.05 | 18 |  |  |  |  |  |  |  |  |
| 4) + 5) | 1.5 |  | 24 | 0.61 | 22.9 | 13.3 | 20 | 0.91 | 34.4 | 20 | 30 |
| 6) $H_2O$: Recycle to 2 | 0.3 |  |  |  | 0 |  | 2 |  |  |  |  |
| 7) $H_2O$: Recycle to Ni | 0.2 |  |  |  | 0 |  | 2 |  |  |  | 2.2 |
| 8) $H_2O$: to barren | 0.1 |  |  |  | 0 |  | 2 |  |  |  |  |

+Total new $H_2O$ = 1.2; total new $H_2SO_4$ = 150 gm.
1 BV = 1 lt volume

As mentioned in the opening paragraphs of the specification, the invention is also applicable to the recovery of copper and zinc from a solution containing cupric copper and zinc. The description in this specification with regard to the selective recovery of nickel and cobalt is therefore equally applicable to the recovery of copper and zinc, with the cupric copper behaving in a manner analogous to nickel and the zinc behaving in a manner analogous to cobaltous cobalt. The references to nickel and zinc are of course references to divalent elements.

Experimental work was carried out to confirm this analogy and results using two copper loading columns in cascade and one zinc column are shown in Table 3. The volume of each copper column was equal to the volume of the zinc column. The solution treated for the recovery of copper and zinc was ammonium sulphate solution containing dissolved cupric copper and zinc of the kind which would be obtained as tailings solution in a process involving the ammoniacal leaching of copper concentrates or copper scrap, which usually contains some zinc. The copper columns and zinc columns were however stripped with ammoniacal ammonium sulphate solution rather than with dilute sulphuric acid as was the case with the nickel column and cobalt columns. The flow rate was 0.05 BV/min and the temperature 60°–80° C. The excellent results obtained are readily seen from Table 3.

TABLE 3

|  |  | gpl Solution or Resin | | | | |
|---|---|---|---|---|---|---|
|  | BV | Cu | Zn | Total Metals | pH | Zn:Cu |
| Tailings soln. to # 1 Cu | 26.1 | 2.0 | 2.7 | 5.4 | 4.0 | 1.3 |
| Depleted Liquor ex # 2 Cu pos. | ( 8.0 | <0.001 | <0.01 | <0.015 | 4.0 |  |
|  | (18.1 | <0.001 | 3.9 | 3.9 | 4.0 |  |
| Feed to Zn Column | 18.1 | <0.001 | 3.9 | 3.9 | 7.5 | 10,000 |
| Barren Liquor | 18.3 | <0.005 | 0.01 | 0.01 | 7.5 |  |
| Product Solutions |  |  |  |  |  |  |
| Cu Product | 0.75 | 69.5 | 1.7 | 71.2 | 4 | 0.02 |
| Zn Product | 0.50 | <0.01 | 75.2 | 75.2 | 4 | 10,000 |
| Resin Loading |  |  |  |  |  |  |
| Cu Column | 1 | 54.6 | 1.3 | 55.9 | — | 0.02 |
| Zn Column | 1 | 0.01 | 38 | 38 |  | 4,000 |

Other embodiments of the invention will be readily apparent to one skilled in the art, the scope of the invention being defined in the appended claims.

What we claim as new and desire to protect by Letters Patent of the United States is:

1. A process for separately recovering nickel and cobalt from a feed solution containing dissolved nickel and cobaltous cobalt, including adjusting the pH of the solution if necessary to a value between about 3 and about 6, and then contacting the solution with a chelating ion exchange resin having aminocarboxylic acid functional groups to selectively load nickel onto the resin to produce a nickel loaded resin and a nickel depleted cobalt containing solution.

2. A process according to claim 1 wherein the pH of the solution is adjusted if necessary to a value between about 4 and about 5.

3. A process according to claim 1 wherein a metal loading cycle is carried out by passing the adjusted solution sequentially through a plurality of nickel loading columns of said ion exchange resin, the first column contacted by the solution being a partially loaded column and the last column contacted being a freshly regenerated column, the solution being passed through the columns until the first contacted column is substantially fully loaded.

4. A process according to claim 3 wherein, after the first contacted column is substantially fully loaded, solution leaving said column is recycled therethrough to displace cobalt from said column and increase the nickel loading thereon.

5. A process according to claim 1 wherein the feed solution is an ammonium sulphate solution.

6. A process according to claim 1 wherein the feed solution is an ammonium sulphate solution and the nickel is subsequently stripped from the nickel loaded resin by means of sulphuric acid.

7. A process according to claim 1 wherein the feed solution contains between about 0.5 and 3.0 gpl dissolved nickel and between about 0.2 and 3.0 gpl dissolved cobaltous cobalt.

8. A process according to claim 1 wherein the pH of the nickel depleted cobalt containing solution is adjusted to a value between about 7 and about 10 and is then contacted with further said ion exchange resin to produce a cobaltous cobalt loaded resin.

9. A process according to claim 8 wherein the pH of the nickel depleted cobalt containing solution is adjusted to a value between about 7.5 and about 8.5.

10. A process according to claim 8 wherein a metal loading cycle is carried out by passing the adjusted solution sequentially through a plurality of nickel loading columns of said ion exchange resin, the first column contacted by the solution being a partially loaded column and the last column contacted being a freshly regenerated column, the solution being passed through the columns until the first contacted column is substantially fully loaded, and a cobalt loading cycle is carried out by contacting solution leaving said last nickel loading column in each of a plurality of nickel loading cycles, after said pH adjustment to between about 7 and about 10, with said further ion exchange resin to cause cobaltous cobalt to be loaded thereon.

11. A process according to claim 8 wherein the feed solution is an ammonium sulphate solution and cobaltous cobalt is stripped from said cobaltous cobalt loaded resin by means of sulphuric acid.

12. A process according to claim 8 wherein the feed solution contains between about 0.5 and 3.0 gpl dissolved nickel and between about 0.2 and about 3.0 gpl dissolved cobaltous cobalt, and wherein the nickel depleted cobalt containing solution contacted with further said ion exchange resin, after said pH adjustment to between about 7 and about 10, contains less than about 0.2 gpl dissolved nickel and between about 0.2 and 3.0 gpl dissolved cobaltous cobalt.

13. A process according to claim 1 wherein the feed solution contains between about 0.5 and 3.0 gpl dissolved nickel, between about 0.2 and 3.0 gpl dissolved cobaltous cobalt, and between about 200 and 550 gpl dissolved ammonium sulphate.

14. A process according to claim 13 wherein the temperature of the solution contacting the ion exchange resin is between about 60° and about 100° C.

15. A process according to claim 1 wherein the feed solution is contacted with the ion exchange resin at a rate between about 0.02 and about 0.08 bed volumes per minute.

16. A process according to claim 8 wherein the adjusted nickel depleted cobalt containing solution is contacted with said further ion exchange resin at a rate between about 0.05 and about 0.12 bed volumes per minute.

17. A process according to claim 1 wherein said chelating ion exchange resin has iminodiacetic acid functional groups.

18. A process according to claim 17 wherein said chelating ion exchange resin is in the ammonium form.

19. A process for separately recovering copper and zinc from a solution containing dissolved cupric copper and zinc, including adjusting the pH of the solution if necessary to a value between about 3 and about 6, and then contacting the solution with a chelating ion exchange resin having aminocarboxylic acid functional groups to selectively load copper onto the resin to produce a copper loaded resin and a copper depleted zinc containing solution.

20. A process according to claim 19 wherein the pH of the solution is adjusted if necessary to a value between about 4 and about 5.

21. A process according to claim 19 wherein the feed solution is an ammonium sulphate solution.

22. A process according to claim 19 wherein the pH of the copper depleted zinc containing solution is adjusted to a value between about 7 and about 10 and is then contacted with further said ion exchange resin to produce a zinc loaded resin.

23. A process according to claim 22 wherein the pH of the copper depleted zinc containing solution is adjusted to a value between about 7 and about 10.

24. A process according to claim 19 wherein said chelating ion exchange resin has iminodiacetic acid functional groups.

25. A process for separately recovering a first metal selected from the group consisting of nickel and copper and a second metal selected from the group consisting of cobalt and zinc from a feed solution containing a first dissolved metal selected from the group consisting of nickel and cupric copper and a second dissolved metal selected from the group consisting of cobaltous cobalt and zinc, said second metal being cobaltous cobalt when said first metal is nickel and said second metal being zinc when said first metal is cupric copper, including adjusting the pH of the solution if necessary to a value between about 3 and about 6, and then contacting the solution with a chelating ion exchange resin having amminocarboxylic acid functional groups to selectively load said first metal onto the resin to produce a said first metal loaded resin and a first metal depleted second metal containing solution.

26. A process according to claim 25 wherein the pH of the first metal depleted second metal containing solution is adjusted to a value between about 7 and about 10 and is then contacted with further said ion exchange resin to produce a second metal loaded resin.

* * * * *